(12) United States Patent
Matsuura et al.

(10) Patent No.: US 8,270,004 B2
(45) Date of Patent: Sep. 18, 2012

(54) IMAGE PROCESSING SYSTEM, INFORMATION PROCESSOR, AND METHOD OF PROCESSING INFORMATION THAT CAN NOTIFY THAT JOB IS COMPLETED

(75) Inventors: Tsumoru Matsuura, Toyokawa (JP); Atsushi Tomita, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1659 days.

(21) Appl. No.: 11/590,875

(22) Filed: Nov. 1, 2006

(65) Prior Publication Data

US 2007/0245009 A1   Oct. 18, 2007

(30) Foreign Application Priority Data

Apr. 4, 2006  (JP) .................................. 2006-103381

(51) Int. Cl.
*G06F 3/12* (2006.01)
*G06K 15/00* (2006.01)
(52) U.S. Cl. ...................... 358/1.15; 358/1.16; 358/1.14; 358/442; 358/402; 709/223
(58) Field of Classification Search .................. None
See application file for complete search history.

(56) References Cited

U.S. PATENT DOCUMENTS

| | | | |
|---|---|---|---|
| 6,219,151 B1 * | 4/2001 | Manglapus et al. | 358/1.15 |
| 6,592,275 B1 * | 7/2003 | Aihara et al. | 400/62 |
| 2002/0105664 A1 * | 8/2002 | Inoue et al. | 358/1.13 |
| 2002/0114004 A1 * | 8/2002 | Ferlitsch | 358/1.15 |
| 2003/0227647 A1 * | 12/2003 | Gallacher | 358/1.15 |
| 2004/0218204 A1 * | 11/2004 | Nomura | 358/1.14 |
| 2005/0094193 A1 * | 5/2005 | Oswald | 358/1.15 |
| 2005/0168765 A1 | 8/2005 | Akune et al. | |
| 2005/0257153 A1 * | 11/2005 | Ben-Shachar et al. | 715/731 |
| 2005/0275885 A1 * | 12/2005 | Sugiyama | 358/1.15 |

FOREIGN PATENT DOCUMENTS

| | | |
|---|---|---|
| JP | 10-285329 A | 10/1998 |
| JP | 2001-109605 A | 4/2001 |
| JP | 2002-091736 A | 3/2002 |
| JP | 2005-215976 | 8/2005 |
| JP | 2006-060475 | 3/2006 |
| JP | 2006-084539 | 3/2006 |

* cited by examiner

*Primary Examiner* — Marivelisse Santiago Cordero
*Assistant Examiner* — Huo Long Chen
(74) *Attorney, Agent, or Firm* — Buchanan Ingersoll & Rooney PC (57) ABSTRACT

In an image processing system an information processor is connected to an image processor. When the image processor detects that a job is completed, the image processor transmits to an image processor that indicates the job information notifying in accordance with a first or second communications protocol that the job is completed. The information processor converts in a predetermined format the information transmitted in accordance with the first communications protocol to notify that a job is completed. Furthermore, the information processor also converts in the predetermined format the information transmitted in accordance with the second communications protocol to notify that a job is completed. The information processor then displays the converted information collectively.

12 Claims, 11 Drawing Sheets

IMAGE PROCESSING SYSTEM, INFORMATION PROCESSOR, AND METHOD OF PROCESSING INFORMATION THAT CAN NOTIFY THAT JOB IS COMPLETED

This application is based on Japanese Patent Application No. 2006-103381 filed with the Japan Patent Office on Apr. 4, 2006, the entire content of which is hereby incorporated by reference.

BACKGROUND OF THE INVENTION

1. Field of the Invention

The present invention relates generally to information processors and information processing systems including information processors, and particularly to information processing systems having interconnected an image processor and an information processor displaying information on notification transmitted from the image processor indicating for example that a job is completed, information processors configuring such information processing system, and methods of processing information in such image processing system.

2. Description of the Related Art

In recent years, multifunction peripherals (MFPs), printers and other similar, image processors having faster processing rates and abundant functions are distributed in large quantities. Such image processors are relatively expensive. Furthermore, install it requires a relatively large space. Accordingly, it is difficult to a lot such image processor for each person. Typically, a plurality of people is allotted one image processor.

If a plurality of users shares a single image processor and a user sends an instruction from a client personal computer (client PC) that is located relatively remote from the image processor to the image processor to execute a job, it is difficult for the user to determine on the spot whether the job that the user has issued the instruction to execute has been completed.

In view of this, Japanese Laid-Open Patent Publication No. 10-285329 discloses that in a network including an image processor and a PC, if at the image processor a job is normally completed or abnormally completed, a result thereof is reported to a previously registered user.

Furthermore Japanese Laid-Open Patent Publication No. 2001-109605 discloses that in a network system including a printer and a PC, if a single user currently causes the printer to execute a plurality of print jobs, then when all of the print jobs of the user are completely output, notification is transmitted to notify the user that the print jobs have completely been output.

Furthermore Japanese Laid-Open Patent Publication No. 2002-091736 discloses that in a network system including a printer and a PC, whenever each print job is completely output, the user having transmitted the print job is notified, in a manner that varies depending on whether there is any other print job of the user, that the print job has been completed.

As disclosed in Japanese Laid-Open Patent Publication Nos. 10-285329 and 2002-091736, whenever a job is completed, a user is notified that the job is completed. This requires the user for example to visually confirm the notification whenever it is received, which can feel cumbersome.

As disclosed in Japanese Laid-Open Patent Publication No. 2001-109605, in contrast, unless for each user all print jobs are completed, notification that the print jobs are completed is not issued. If the user desires to confirm whether a job that the user has earlier issued an instruction to execute is completed, the user must wait for some period of time before he/she receives notification that the job is completed, which can feel inconvenient.

Furthermore some MFPs increasingly distributed in recent years that are equipped with a plurality of functions such as copying, faxing, printing, scanning and the like notify in manners different for different functions that a job is completed. Furthermore, if identical functions of different manufacturers, models and the like are effected to complete a job, notification that the job is completed can be issued in different manners. This requires the user to handle a plurality of operations, items of application software and the like corresponding to the different, individual manners of notification, which is cumbersome.

SUMMARY OF THE INVENTION

The present invention has been made to overcome such disadvantages and it contemplates an image processing system that can notify, in a manner that feels less cumbersome for users, that a job has been completed.

In accordance with the present invention an image processing system is an image processing system having at least one image processor and at least one information processor interconnected. The image processor includes a reception portion receiving an instruction to execute a job from the information processor, a detection portion detecting that the job is completed, and a notification portion operative in response to the detection portion detecting that the job is completed to transmit notification information notifying, in accordance with one of a first communications protocol and a second communications protocol different from the first communications protocol, the information processor that the job is completed. The information processor including a first conversion portion converting in a predetermined format the notification information transmitted from the notification portion in accordance with the first communications protocol, a second conversion portion converting in a format identical to the predetermined format the notification information transmitted from the notification portion in accordance with the second communications protocol, and an information display portion collectively displaying the notification information converted by the first conversion portion and the notification information converted by the second conversion portion.

In accordance with the present invention an information processor connected to at least one image processor, comprising: a first reception portion receiving first notification information transmitted from the image processor in accordance with a first communications protocol and notifying that a job that the information processor has issued an instruction to execute is completed; a second reception portion receiving second notification information transmitted from the image processor in accordance with a second communications protocol different from the first communications protocol and notifying that a job that the information processor has issued an instruction to execute is completed; a first conversion portion converting in a predetermined format the first notification information into first converted information; a second conversion portion converting in a format identical to the predetermined format the second notification information into second converted information; and an information display portion collectively displaying the first converted information and the second converted information.

In accordance with the present invention a method of processing information by use of an information processor, notifying that a job which an image processor is instructed to perform is completed in the image processor, comprising: a first reception step of receiving first notification information transmitted from the image processor in accordance with a first communications protocol and notifying that a job that the information processor has issued an instruction to execute is completed; a second reception step of receiving second notification information transmitted from the image processor in accordance with a second communications protocol different from the first communications protocol and notifying that a job that the information processor has issued the instruction to execute is completed; a first conversion step of converting in a predetermined format the first notification information into first converted information; a second conversion step of converting in a format identical to the predetermined format the second notification information into second converted information; and a step of collectively displaying said first converted information and said second converted information.

In accordance with the present invention, information transmitted from an image processor in accordance with different communications protocols to notify that jobs are completed is converted in an information processor in a single format and collectively displayed. As such if a user is notified in accordance with different communications protocols that jobs are completed, the user is not required to perform different operations, initiate different items of application software and the like that correspond to the different, individual communications protocols, respectively. The information processor can more conveniently be used and the user no longer feels cumbersome.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

1) System Components

Initially an image processing system corresponding to a first embodiment of the present invention will be described in configuration.

Figure 1:
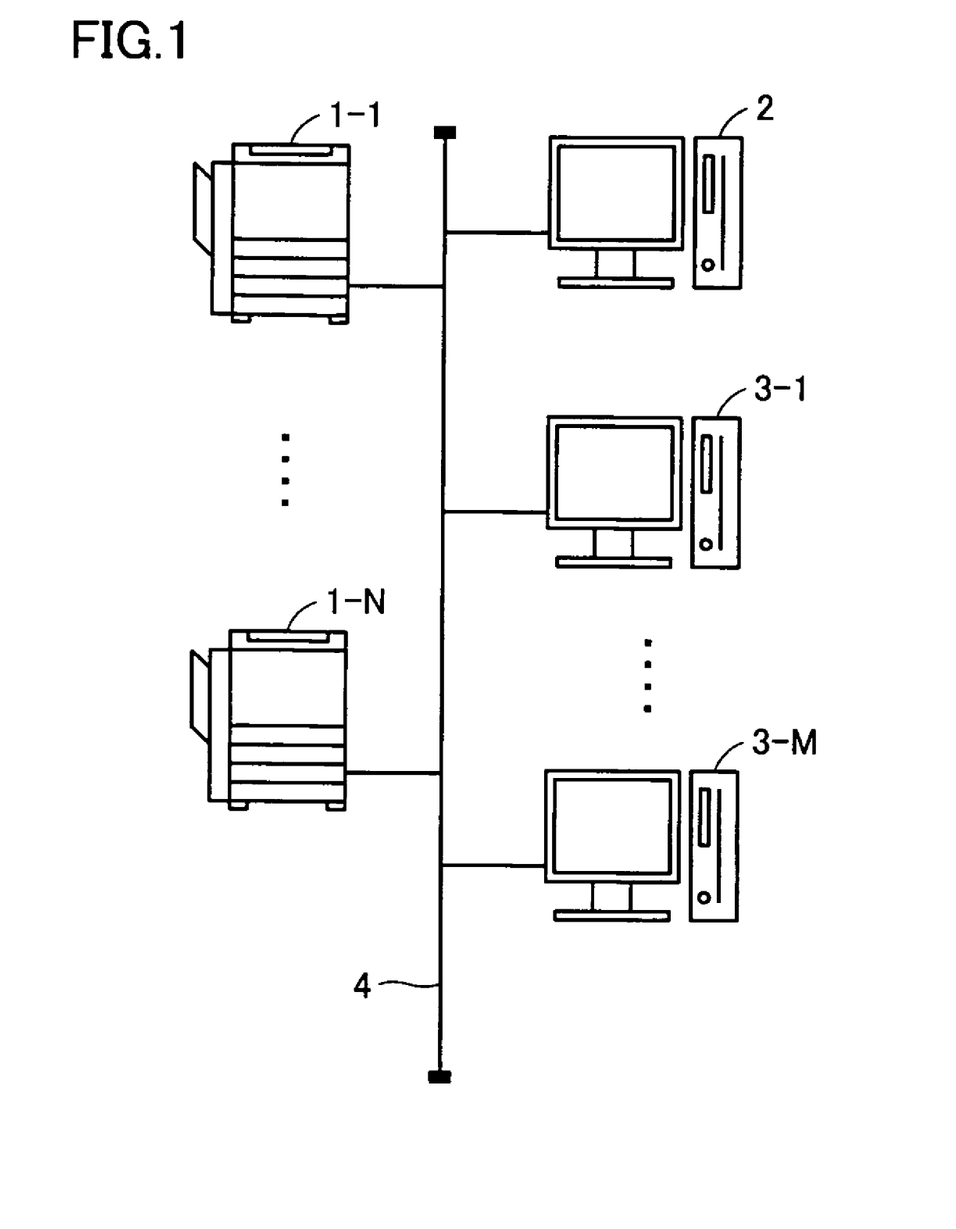
FIG. 1 schematically shows a configuration of an image processing system corresponding to a first embodiment of the present invention.

With reference to FIG. 1, an image processing system includes N image processors 1-1 to 1-N, a server 2, and M information processors 3-1 to 3-M, wherein N and M are each any integer. All these processors are connected on a network 4.

Network 4 may be a network utilizing a dedicated line such as a local area network (LAN), a network utilizing a public network, or a wireless network.

Image processors 1-X forms, on a sheet, an original image read out on its own, or a duplicate of an image generated from data to be printed transmitted from an information processor 3-Y, wherein X=1 to N and Y=1 to M.

Data to be printed may be a plotting instruction in page description language, i.e. a plotting instruction issued by the operating system or application program of information processor 3-Y converted into a page description language that can be processed by image processor 1-X, a bit map having a plotting instruction issued by an operating system or application program transferred into a bit map image, or a document file per se such as in Portable Document Format (PDF) or Tagged Image File Format (TIFF).

Image processor 1-X can transmit image data obtained by reading out an original image to information processor 3-Y or to another image processor in the image processing system via network 4.

Figure 2:
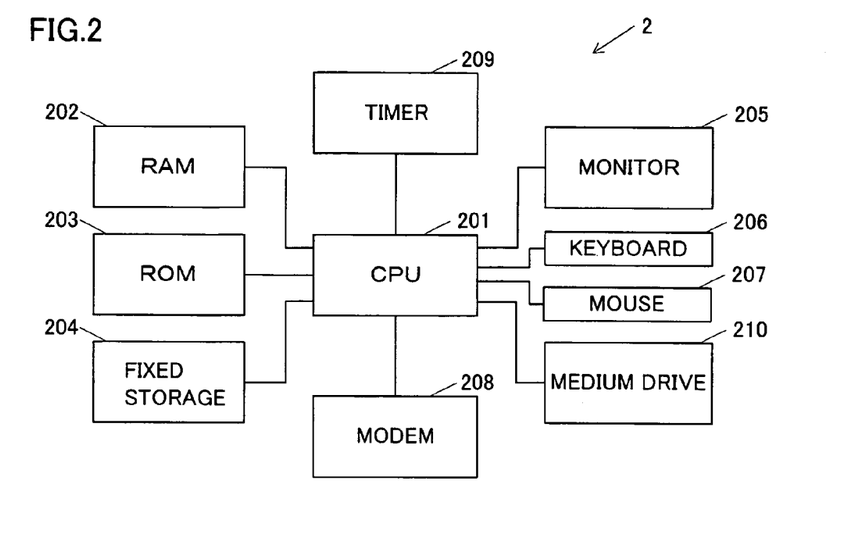
FIG. 2 schematically shows an internal configuration of a server shown in FIG. 1.
Figure 3:
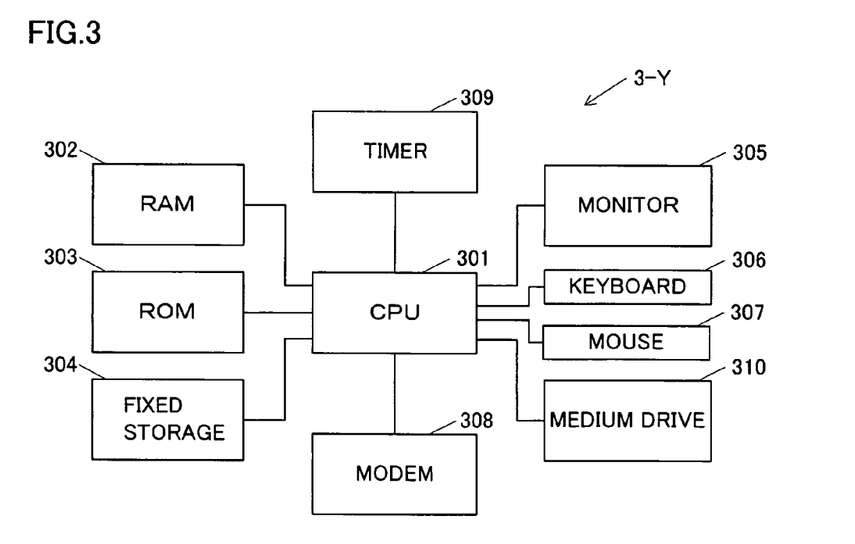
FIG. 3 schematically shows an internal configuration of an information processor shown in FIG. 1.

With reference to FIGS. 2 and 3, server 2 and information processor 3-Y are configured as described hereinafter.

Server 2 and information processor 3-Y are formed of general computer devices including, as shown in FIGS. 2 and 3, respectively, CPUs 201 and 301, random access memories (RAMs) 202 and 302, read only memories (ROMs) 203 and 303, fixed storages (Hard Disk Drives (HDDs) and the like) 204 and 304, monitors 205 and 305, keyboards 206 and 306, mouse 207 and 307, modems 208 and 308, timers 209 and 309, media drives 210 and 310, and the like.

Information processor 3-Y responds to an instruction from the user to generate data to be printed and transmit the generated data to be printed to image processor 1-X.

Figure 4:
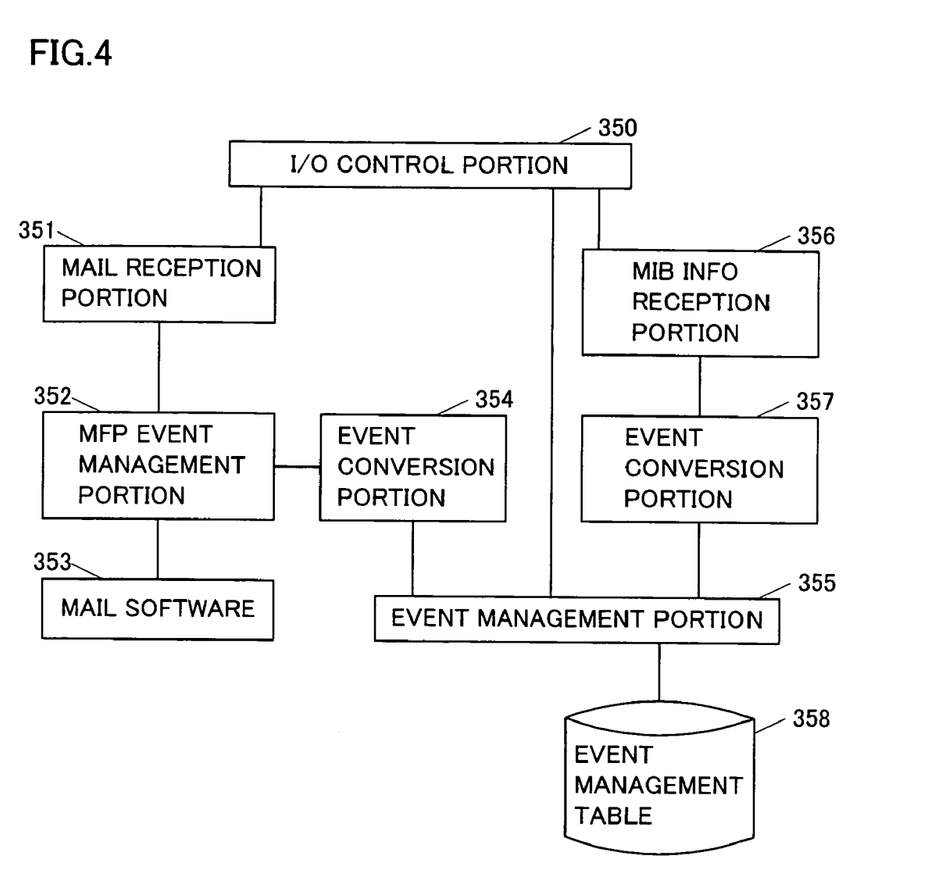
FIG. 4 is a control block diagram of an information processor of FIG. 3.

With reference to FIG. 4, a control system in information processor 3-Y will be described. Each component shown in FIG. 4 is configured by CPU 301, RAM 302, ROM 303, fixed storage 304, and modem 308, as appropriate.

With reference to FIG. 4, an input/output (I/O) control portion 350 controls the inputting and outputting of information in CPU 301 of information processor 3-Y. Furthermore, I/O control portion 350 controls the inputting and outputting of information communicated with monitor 305, information communicated through a network port, and the like.

A mail receiving portion 351 receives only mail information among information on network 4 that is transmitted from a post office protocol (POP) server. Mail receiving portion 351 transmits the received mail information to an MFP event management portion 352.

MFP event management portion determines whether the received mail information is event information transmitted from image processor 1-X. If so, MFP event management portion 352 transmits the event information to an event conversion portion 354, otherwise transmits the mail information to mail software 353 cooperating with mail receiving portion 351 in accordance with mail software installed in information processor 3-Y to generate and communicate electronic mail and store and manage received mail. The mail information transmitted to mail software 353 is read by the user as well as general mail information.

Note that MFP event management portion 352 can determine whether mail information received by mail receiving portion 351 is event information transmitted from image processor 1-X by: specifying the information from information included in an address indicated in the received mail information; analyzing text, a subject and the like in the mail information; and the like.

Even conversion portion 354 converts the received mail into data in the form of an event management table (a format conforming to an event management table described later) predetermined as based on head information, body information and the like of the mail, and transmits the data to event management portion 355.

An MIB information receiving portion 356 inquires of each image processor 1-X on network 4 for each predetermined period of time for example by obtaining MIB information whether an event has arisen. If MIB information receiving portion 356 determines from the MIB information that an event has arisen, MIB information receiving portion 356 transmits the information to event conversion portion 357.

Even conversion portion 357 can understand from the MIB information in which one of image processors 1-1 to 1-X the event has arisen and the content(s) of the event. Even conversion portion 357 converts the MIB information into data in the form of the event management table as described above and transmits the data to event management portion 355.

Event management portion 355 receives the data (i.e., event information obtained from the MIB information) from event conversion portion 357 and stores the received data to event management table 358 together with the data received from event conversion portion 354 (i.e., event information obtained from mail information).

Table 1 shows one example of event management table 358.

TABLE 1

Event Management Table

| Management No. | Date and Time at which Event Arises | Equipment in Which Event has Arisen | Content(s) of Event |
|---|---|---|---|
| 0001 | 4/1 at 10:00 | Image Processor A | Print Job Completed |
| . | . | . | . |
| . | . | . | . |
| . | . | . | . |

In the event management table shown in Table 1, a management number serving as a serial number for an event, a date and time at which the event arises, information that specifies equipment on network 4 in which the event has arisen, and the content(s) of the event are stored in association with each other.

The management number is assigned by event management portion 355 for each event when information is transmitted from event conversion portions 354 and 357 to event management portion 355.

The date and time at which the event arises is information of the date and time if mail information, MIB information and/or the like include(s) date and time information, otherwise it is information corresponding to a time indicated by timer 309 when the event is written to the table.

Stored in the "Equipment in Which Event Has Arisen" column is, for example, information obtained from information of a sender included in a header of mail information, information read from MB information managed in an image processor, or an IP address.

The content(s) of an event is/are information obtained as a result obtained as event management portion 355 analyzes text, a subject and the like of mail information in accordance with a predetermined program, or information read by event management portion 355 from MIB information.

Figure 5:
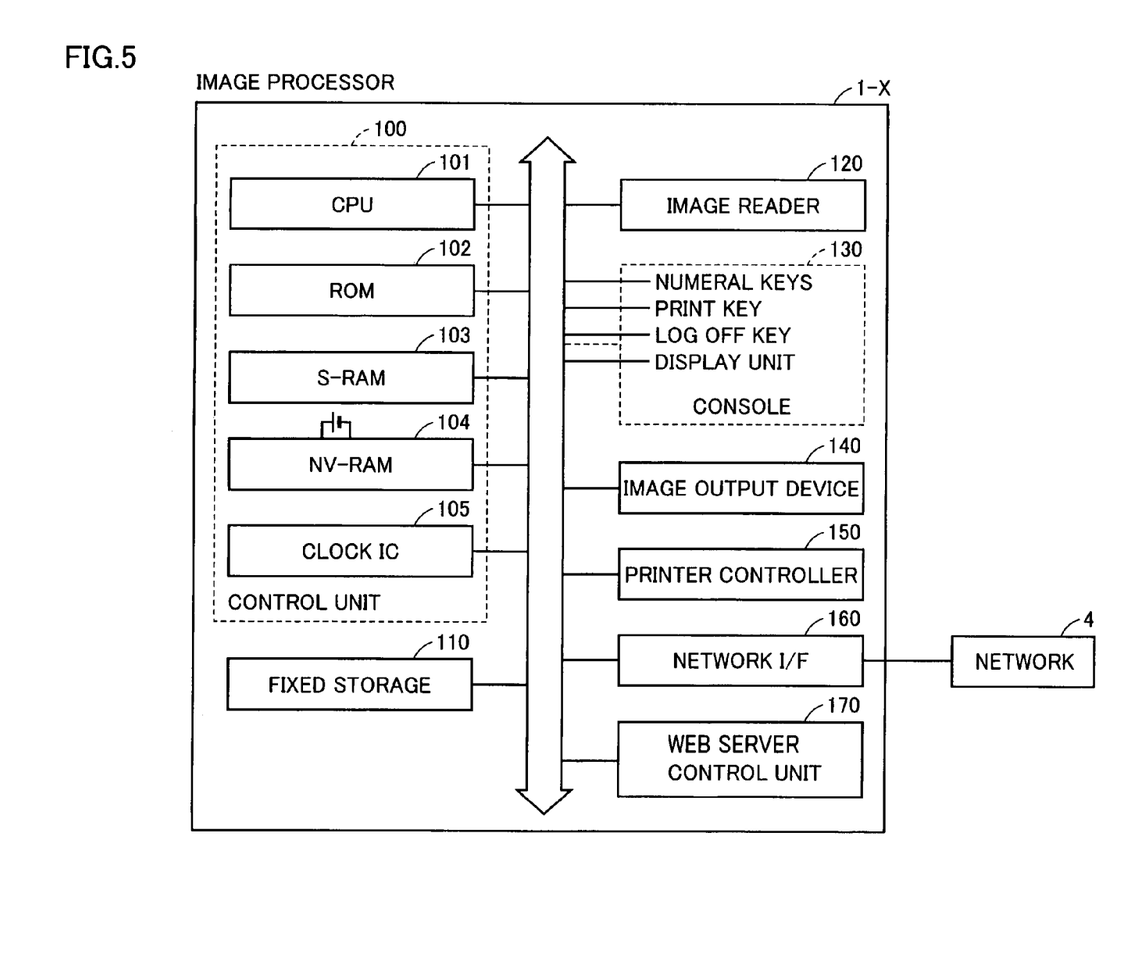
FIG. 5 schematically shows an internal configuration of the information processor of FIG. 1.

With reference to FIG. 5, image processor 1-X has an internal configuration as described hereinafter.

With reference to the figure, image processor 1-X includes a control unit 100, a fixed storage 110, an image reader 120, a console 130, an image output device 140, a printer controller 150, a network interface (network I/F) 160, and a web server control unit 170.

Control unit 100 includes a CPU 101, a ROM 102, a static random access memory (S-RAM) 103, a nonvolatile random access memory (NV-RAM) 104, and a clock integrated circuit (IC) 105. CPU 101 executes a control program stored in ROM 102. S-RAM 103 is used as a working memory. Various settings related to image formation are stored in NV-RAM 104 that is backed up by a battery.

Image reader 120 for reading out an original image, console 130 including keys and a display for various entries by the user, network I/F 160 for communicating various information with external apparatus including information processor 3-Y connected on network 4, printer controller 150 generating a duplicate image from data to be printed received via network I/F 160, and image output device 140 for forming a duplicate image on a sheet are connected to control unit 100, each through a bus. Further, fixed storage 110 is connected to control unit 100 via a bus. Fixed storage 110 is, for example, a hard disk.

2) Notification by Image Processor that Job is Completed

Image processor 1-X executes a print job based on data received from information processor 3Y to be printed. When the job is completed, CPU 101 of image processor 1-X notifies the sender of the data to be printed, or image processor 3-Y, or server 2 accordingly.

Note that CPU 101 can notify, in accordance with a plurality of different protocols, that a job is completed. Furthermore, CPU 101 can notify, in accordance with different protocols for different functions, that a job is completed. More specifically, if a facsimile is received, CPU 101 notifies the user accordingly by transmitting mail in accordance with the simple mail transfer protocol (SMTP) to a user who is assumed to correspond to the address of that facsimile. If a print job that a user has transmitted from information processor 3-Y is completed, CPU 101 notifies information processor 3-Y accordingly in accordance with the simple network management protocol (SNMP).

2-1) Notification that Utilizes SMTP

When a job is completed (a facsimile is received) or a similar event for which notification should be issued arises in image processor 1-X, CPU 101 of image processor 1-X obtains information required to issue the notification, such as the mail address of information processor 3-Y corresponding to the source of the facsimile, the address of a mail server on network 4, a message to be transmitted, and the like, to generate mail for the notification and employs the SMTP to transmit the mail to an SMTP server. Note that CPU 101 can detect that a job is completed. When CPU 101 detects that a job is completed, CPU 101 determines that an event for which notification should be issued has arisen.

If information processor 3-Y has mail reception software initiated, then in response to the transmission of the mail to the SMTP server, mail information addressed from a post office protocol (POP) server to information processor 3-Y (i.e., a mail address set in the mail reception software installed therein) is received.

Thus when an event for which notification should be issued arises in image processor 1-X, mail information is accordingly transmitted to information processor 3-Y.

2-2) Notification that Utilizes SNMP

When a job is completed (a print job is completed) or a similar event for which notification should be issued arises in image processor 1-X, CPU 101 of image processor 1-X rewrites management information base (MIB) information managed in its own processor.

Each information processor 3-Y monitors the MIB information of image processor 1-X through the SNMP at constant temporal intervals. If each information processor 3-Y determines that, of the MIB information of image processor 1-X, there is information that a user should be notified of, then information processor 3-Y causes monitor 305 to display accordingly. The user of each information processor 3-Y is thus notified through the SNMP that an event has arisen in image processor 1-X.

3) Process in Image Processor

Figure 6:
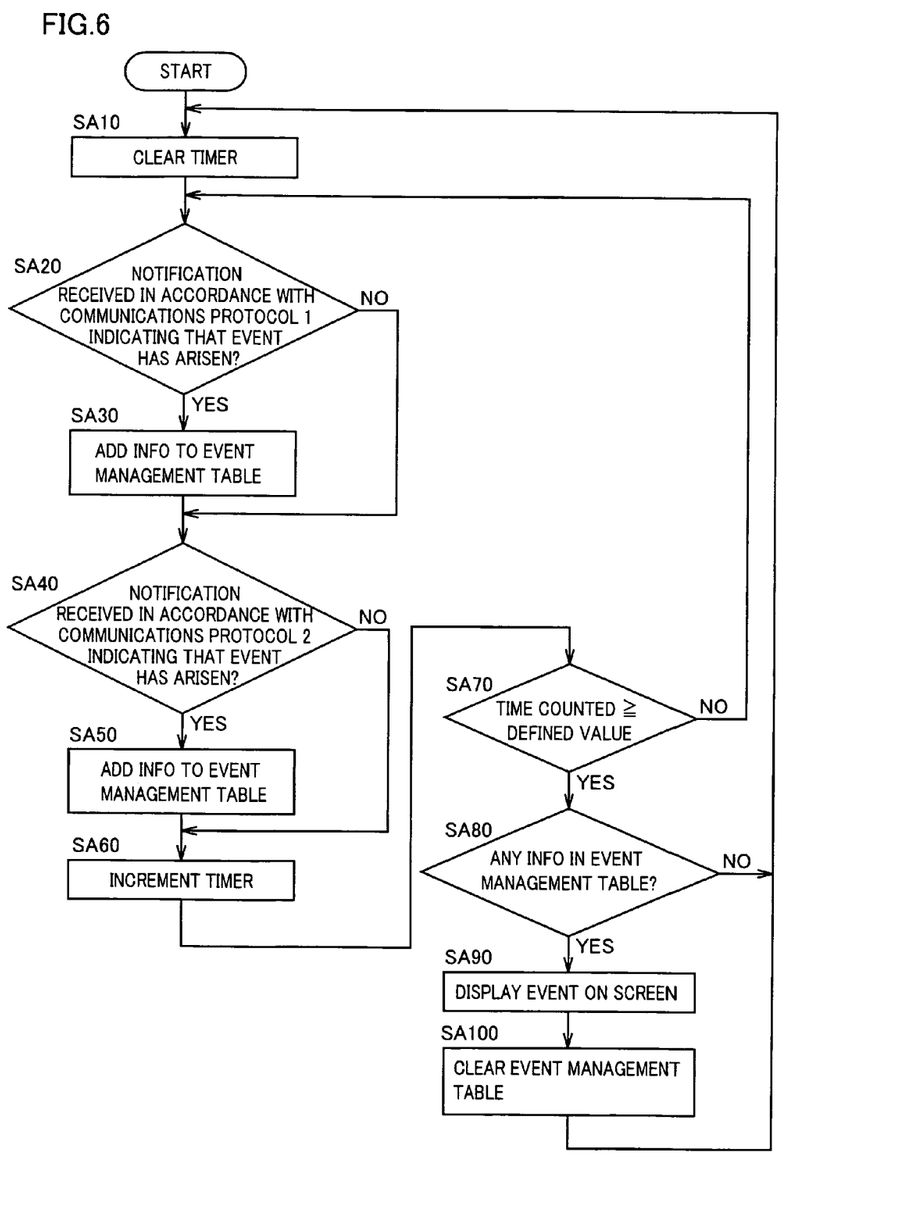
FIG. 6 is a flow chart of a process executed by a CPU of the information processor of FIG. 1 to notify a user that an event has arisen in an image processor.

With reference to FIG. 6 will be described specifically a process performed in each image processor 3-Y by CPU 301 to notify a user that an event has arisen in image processor 1-X.

With reference to FIG. 6, CPU 301 initially proceeds to step SA10 to clear timer 309.

Then CPU 301 proceeds to step SA20 determines whether notification has been received in accordance with a communications protocol 1 (a first one of a plurality of protocols that can be processed by information processor 3-Y, e.g., the SMTP) notifying that an event has arisen. If so, CPU 301 proceeds to step SA30 to convert the content(s) of the notification, as appropriate, and store the converted data to the event management table, and proceeds to step SA40. If CPU 301 determines that such notification is not received, CPU 301 proceeds directly to step SA40.

At step SA40 CPU 301 determines whether notification has been received in accordance with a communications protocol 2 (a second one of the plurality of protocols that can be processed by information processor 3-Y, e.g., the SNMP) notifying that an event has arisen. If so, CPU 301 proceeds to step SA50 to convert the content(s) of the notification, as appropriate, and store the converted data to the event management table, and proceeds to step SA60. If CPU 301 determines that such notification is not received, CPU 301 proceeds directly to step SA60. Note that the data stored by CPU 301 at step SA30 to the event management table and that stored by CPU 301 at step SA50 to the event management table are of the same format (the form of the event management table aforementioned).

At step SA60 CPU 301 increments timer 309.

Then CPU 301 proceeds to step SA70 to determine whether the time counted by timer 309 has reached a predetermined, defined value, and if so then CPU 301 proceeds to step SA80, otherwise returns to step SA20.

At step SA80 CPU 301 determines whether the event management table has stored therein information on at least one event. If so CPU 301 proceeds to step SA90, otherwise returns to step SA20.

At step SA90 CPU 301 causes monitor 305 to display on a screen the content(s) stored in the event management table.

Then CPU 301 clears the content(s) stored in the event management table and returns to step SA10.

Thus when an information processor receives from image processor 1-X notification of an event corresponding to the information processor, the information processor initially stores the content(s) of the notification to an event management table. Whenever a predetermined period of time elapses, the content(s) stored in the event management table is/are collectively displayed to allow a user to be notified thereof.

Collectively notifying the user of the content(s) whenever the predetermined period of time elapses allows the user to handle some notifications of a plurality of events collectively and can thus liberate the user from the necessity of handling notification whenever it is received for each event.

Furthermore, information on notification transmitted in accordance with a plurality of protocols can collected together in a single table to notify a user thereof. As such, even if information processor 3-Y employs different user interfaces for different protocols, respectively, the user interfaces can be integrated together for notification of an event.

Thus in the present embodiment event information transmitted from image processor 1-X using different communications protocols (SMTP and SNMP) can be converted in information processor 3-Y to data in a single format (or the form of an event management table) and collectively displayed.

Second Embodiment

Figure 7:
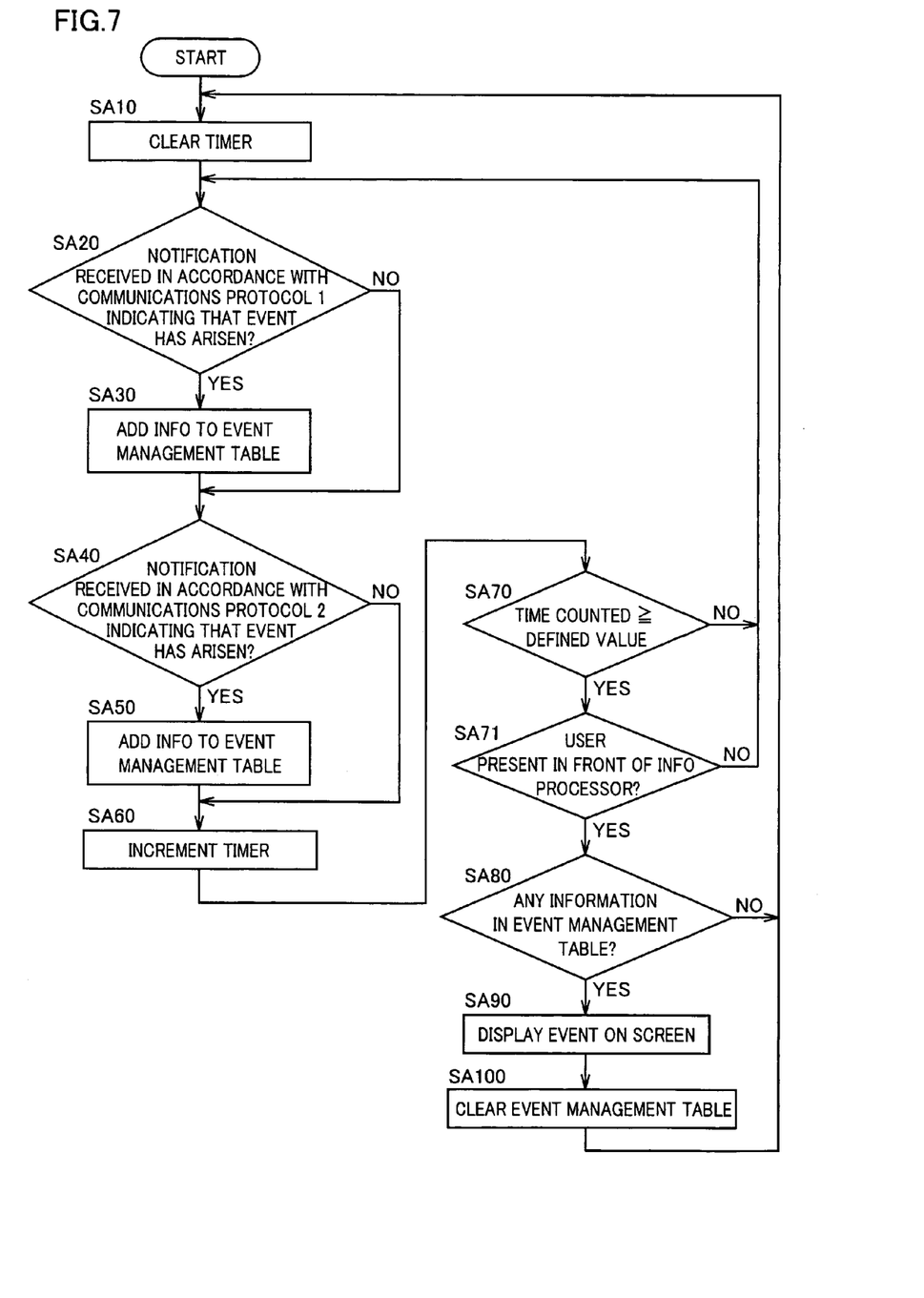
FIG. 7 is a flow chart of a process executed in an image processing system of a second embodiment of the present invention by a CPU of an image processor to notify a user that an event has arisen in an image processor.

With reference to FIG. 7 a process performed in an image processing system of a second embodiment of the present invention by CPU 301 of information processor 3-Y will specifically be described. Note that the process shown in FIG. 7 corresponds to an exemplary variation of that shown in FIG. 6. The image processing system of the present embodiment is similar in configuration to that of the first embodiment unless otherwise specified.

With reference to FIG. 7, in this exemplary variation, CPU 301 performs steps SA10-SA70, which are similar to those indicated in the flow chart shown FIG. 6 and corresponding thereto. Then if at step SA70 CPU 301 determines that the time counted by timer 305 has reached a defined value, CPU 301 proceeds to step SA71 to determine whether there is a user present in front of its own processor. If so, then CPU 301 proceeds to step SA80, otherwise returns to step SA10 without effecting a process performed in step SA80 et seq. for notification to user.

In the process of the present embodiment if a user is present in front of information processor 3-Y continuously for a predetermined period of time (or if the user is operating information processor 3-Y) notification is made whenever a predetermined period of time elapses.

Thus if a user is continuously not operating information processor 3-Y, e.g., if the user is absent in front of information processor 3-Y for a relatively long period of time, and then again operates the information processor, the user can be liberated from the necessity of consecutively handling one or more notifications transmitted whenever the predetermined period of time elapses.

Note that the decision that is made in step SA71 on whether a user is present in front of information processor 3-Y may be made as based on an output representative of detection done by an infrared sensor provided to information processor 3-Y, or it may be made by determining whether information processor 3-Y has logged in network 4.

Third Embodiment

Figure 8:
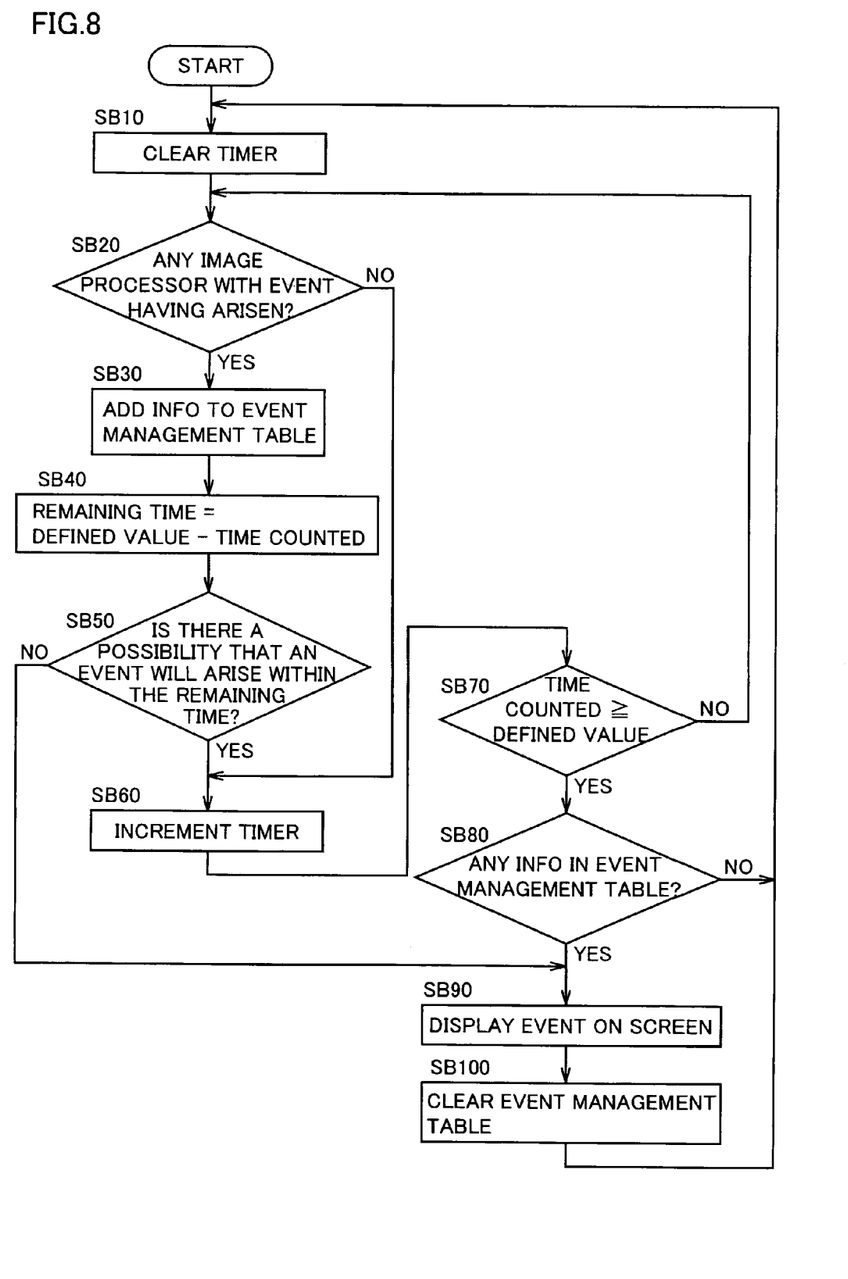
FIG. 8 is a flow chart of a process executed in an image processing system of a third embodiment of the present invention by a CPU of an image processor to notify a user that an event has arisen in an image processor.

With reference to FIG. 8 a process performed in an image processing system of a third embodiment of the present invention by CPU 301 of information processor 3-Y will specifically be described. Note that the process shown in FIG. 8 corresponds to an exemplary variation of that shown in FIG. 6. The image processing system of the present embodiment is similar in configuration to that of the first embodiment unless otherwise specified.

With reference to FIG. 8, CPU 301 initially proceeds to step SB10 to clear timer 309.

Then CPU 301 proceeds to step SB20 to determine whether notification that an event has arisen has been received from any of image processors 1-1 to 1-N and if so CPU 301 proceeds to step SB30 to store the content(s) of the notification to the event management table and proceeds to step SB40. Note that steps SB20 and SB30 are assumed to indicate a process identical to steps SA20-SA50 shown in FIG. 6. If CPU 301 determines that such notification is not received, CPU 301 proceeds to step SB60.

At step SB40 CPU 301 calculates a defined value minus the time currently counted by timer 305 and stores the difference to RAM 302 as a remaining time.

Then CPU 301 proceeds to step SB50 to transmit information to image processors 1-1 to 1-N to inquire of the image processors whether there is a possibility that an event related to its own processor or a user currently logging therein will arise during the remaining time as calculated at step SB40 (or whether such event is to so arise) and CPU 301 checks the contents of the replies received from image processors 1-1 to 1-N.

Image processors 1-1 to 1-N having received such information transmit information as a reply as based on how they currently have jobs accumulated therein. More specifically, CPU 101 of each of image processors 1-1 to 1-N specifies the job(s) currently accumulated in its own processor that is/are considered to be completed within the remaining time, and CPU 101 determines whether among the specified job(s) there is a print job originating from or a fax reception job addressed to information processor 3-Y having transmitted information at step SB50 or a user currently logging therein. If CPU 101 determines that there is such a job then CPU 101 replies information processor 3-Y that there is a possibility that an event will arise. If CPU 101 determines that there is no such job, CPU 101 replies information processor 3-Y that there is no possibility that an event will arise.

When a reply is received from each image processor 1-1 to 1-N, CPU 301 proceeds to step S50 to check the content(s) of the reply. If CPU 301 receives from at least one image processor 1-X a reply that there is a possibility that an event will arise, then CPU 301 proceeds to step SB60. If CPU 301 receives from all image processors 1-1 to 1-N a reply there is no possibility that an event will arise, CPU 301 proceeds to step SB90.

At step SB60 CPU 301 increments timer 305 and proceeds to step SB70.

At step SB70 CPU 301 determines whether the time counted by timer 309 has reached a predetermined, defined value, and if so then CPU 301 proceeds to step SB80, otherwise returns to step SB20.

At step SB80 CPU 301 determines whether the event management table has stored therein information on at least one event. If so, CPU 301 proceeds to step SB90, otherwise returns to step SB20.

At step SB90 CPU 301 causes monitor 305 to display on a screen the content(s) stored in the event management table.

Then CPU 301 proceeds to SB100 to clear the content(s) stored in the event management table and returns to step SB10.

In the process of the present embodiment, basically, notification from image processors 1-1 to 1-N indicating that an event has arisen is issued whenever a predetermined period of time elapses. However, if the predetermined period of time has not yet elapsed and a decision is made that there is no possibility that any further event will arise before the predetermined period of time elapses, then, at that temporal point, i.e., despite that the predetermined period of time has not yet elapsed, information processor 3-Y notifies a user of the event(s) having arisen.

This allows the information processor to effectively less frequently and also in real time notify a user that an event has arisen.

Furthermore, in the present invention, notification that an event has arisen is issued before the predetermined period of time elapses if a decision is made that there is no possibility that any further event will arise before the predetermined period of time elapses, as described in the present embodiment. Alternatively, such notification may be issued before the predetermined period of time elapses if at least a predetermined number of events has arisen and information been stored in the event management table before the predetermined period of time elapses. This allows one notification for a user to include no more than the predetermined number of events and also allows RAM 302 prepared for the event management table to have a capacity equal to or smaller than that prescribed, i.e., a capacity reduced to an extent.

Fourth Embodiment

Figure 9:
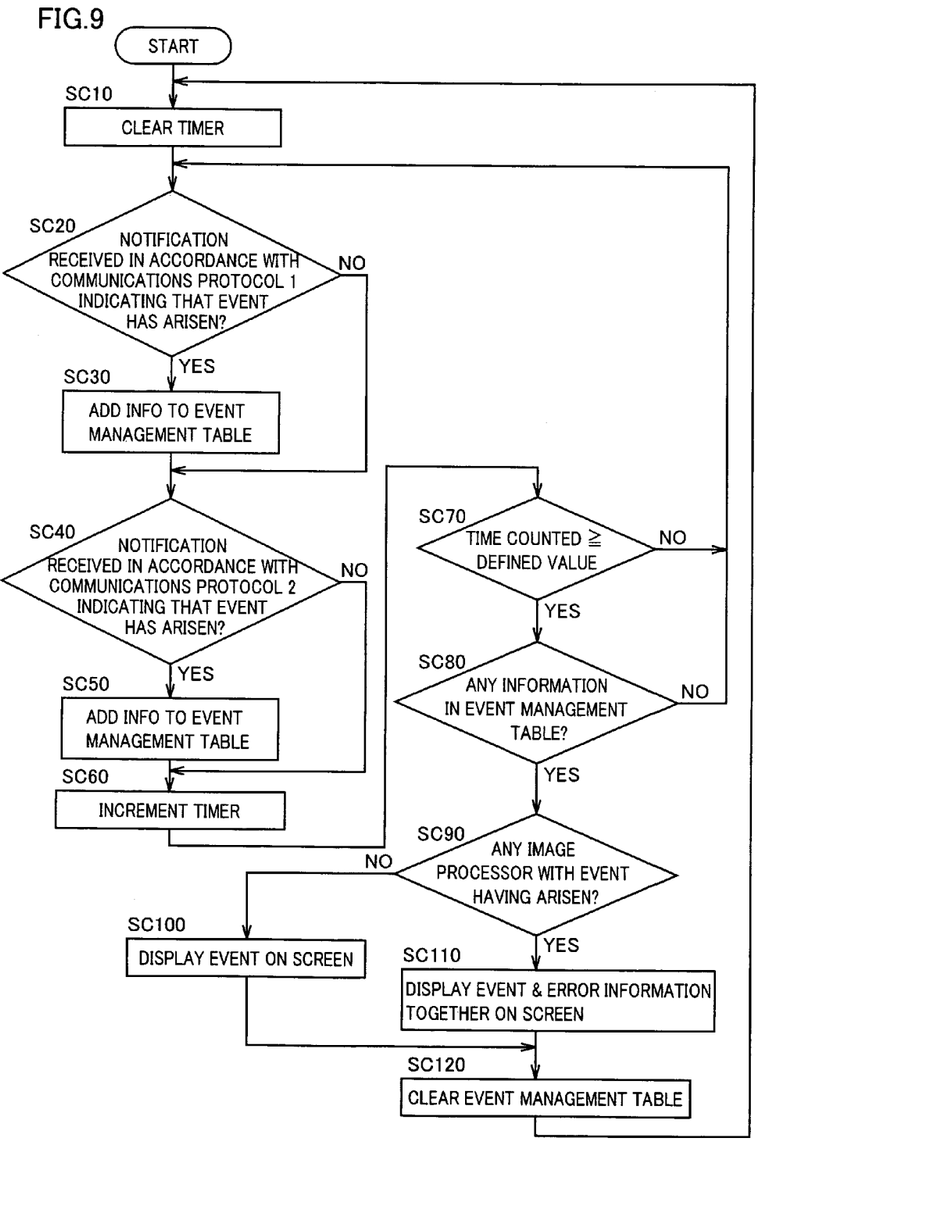
FIG. 9 is a flow chart of a process executed in an image processing system of a fourth embodiment of the present invention by a CPU of an image processor to notify a user that an event has arisen in an image processor.

With reference to FIG. 9 a process performed in an image processing system of a fourth embodiment of the present invention by CPU 301 of information processor 3-Y will specifically be described. Note that the process shown in FIG. 9 corresponds to an exemplary variation of that shown in FIG. 6. The image processing system of the present embodiment is similar in configuration to that of the first embodiment unless otherwise specified.

With reference to FIG. 9 CPU 301 performs steps SC10-SC70, which are identical to SA10-SA70 indicated in FIG. 6.

At step SC80 CPU 301 determines whether the event management table has stored therein information on at least one event. If so, CPU 301 proceeds to step SC90, otherwise returns to step SC20.

At step SC90 CPU 301 requests image processors 1-1 to 1-N to transmit error information to detect whether there is an error arising in any of them. If so CPU 301 proceeds to step SC110, otherwise proceeds to step SC100. Note that the error can include that: image processors 1-1 to 1-N have a paper jam; a user to be notified if an event has arisen issues an instruction to output a job and although an image processor outputs a sheet the sheet is not picked up for at least a predetermined period of time; a user to be notified if an event has arisen causes equipment connected to network 4 to store an amount of information that is larger than defined; and the like.

At step SC100 CPU 301 causes monitor 305 to display on a screen the content(s) stored in the event management table.

At step SC110, in contrast, CPU 301 causes monitor 305 to display on a screen the content(s) stored in the event management table and together therewith information on an error as obtained at step SC90 (i.e., which image processor has what error), and proceeds to step SC120.

At step SC120 CPU 301 clears the content(s) stored in the event management table and returns to step SC10.

In the process of the present embodiment if any of image processors 3-1 to 3-N has an error image processors 3-1 to 3-N notify that an event has arisen and together therewith information on that error.

This allows a user receiving notification that an event has arisen and moving to an image processor to pick up an output sheet to take an action to resolve an error state caused in that image processor or another image processor. This can save the user the trouble of moving to the location of an image processor only for the purpose of resolving the error state.

Fifth Embodiment

Hereinafter a fifth embodiment of the present image processing system will be described.

In the present embodiment information on each of information processors 3-1 to 3-M and each of image processors 1-1 to 1-N is managed in server 2. Hereinafter a process performed by CPU 201 of server 2 in the present embodiment will mainly be described. Note that the image processing system of the present embodiment is similar in configuration to that of the first embodiment unless otherwise specified.

Note that in the present embodiment server 2 has RAM 202 with information stored therein indicating which user currently logs in each of information processors 3-1 to 3-M.

Furthermore in the present embodiment RAM 202 of server 2 has stored therein information on a user of network 4, hereinafter also referred to as user information, as shown in Table 2.

TABLE 2

User Information

| Name | Log-In Name | Mail Address | Notification Protocol |
|---|---|---|---|
| color | red | blue@aaa.com | SNMP |
| zoo | panda | dog@aaa.com | SMTP |
| . | . | . | . |
| . | . | . | . |
| . | . | . | . |

With reference to Table 2, in the user information, a table (a user management table) is stored in which a name, a log-in name, a mail address and a notification protocol are associated with each other for each user. Note that the notification protocol is a protocol that each user desires to use when the user is notified that an event has arisen.

Furthermore in the present embodiment the event management table is collectively stored in RAM 202 of server 2, rather than RAM 302 of each information processors 3-1 to 3-M, as shown in Table 3.

TABLE 3

Event Management Table

| Management No. | Date and Time at Which Event Arises | Equipment in Which Event Has Arisen | Content(s) of Event | Log-In Name |
|---|---|---|---|---|
| 0001 | 4/1 at 10 00 | Image Processor A | Print Job Completed | zoo |
| . | . | . | . | |
| . | . | . | . | |
| . | . | . | . | |

With reference to Table 3, in the present embodiment, the event management table has stored therein for each event a management number, a date and time at which an event arises, equipment in which the event has arisen, the content(s) of the event, and, in addition, information for specifying a user who is notified that the event has arisen (i.e., a log-in name).

Figure 10:
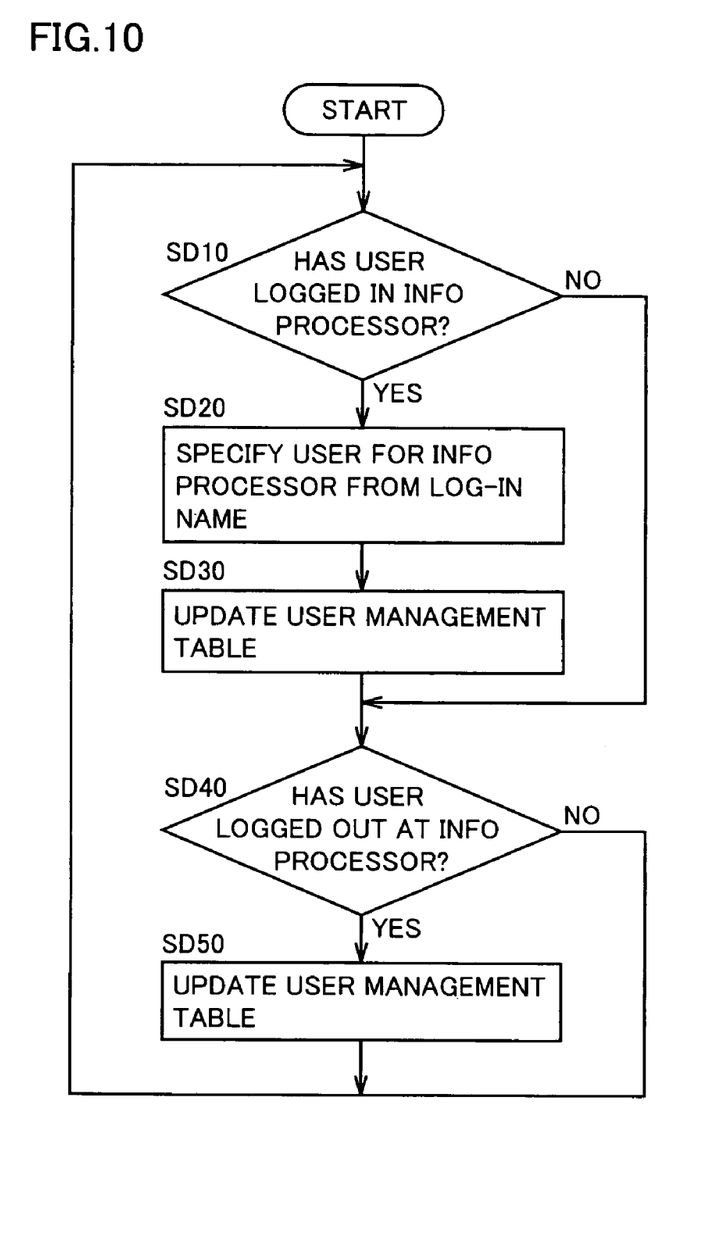
FIG. 10 is a flow chart of a process executed in an image processing system of a fifth embodiment of the present invention by a CPU of a server to manage a user utilizing each information processor.

In the present embodiment CPU 201 effects a process to manage a user utilizing each information processor 3-1 to 3-M and a process to notify a user of notification received from an image processor indicating that an event has arisen. Hereinafter these processes will be described. FIG. 10 is a flow chart of the former process.

With reference to FIG. 10 at step SD10 CPU 201 communicates information with each information processor 3-1 to 3-M to determine whether any of the information processors is operated by a user to log in. If so CPU 201 proceeds to step SD20, otherwise proceeds to step SD40.

At step SD20 CPU 201 specifies, for an information processor operated to log in, a logged-in user from a log-in name, and proceeds to step SD30.

At step SD30 CPU 201 updates the user management table, as based on information obtained at steps SD10 and SD20, and proceeds to step SD40.

At step SD40 CPU 201 determines whether any of information processors 3-1 to 3-M is operated by a user to log out. If so CPU 201 proceeds to step SD50 to accordingly update the user management table and returns to step SD10. If CPU 201 determines that none of information processors 3-1 to 3-M is operated by a user to log out CPU 201 returns directly to step SD10.

Thus in the process described with reference to FIG. 10 server 2 will manage which user logs in information processors 3-1 to 3-M.

The user information described with reference to Table 2 can be modified in content, as appropriate, in server 2 or each information processor 3-1 to 3-M.

Figure 11:
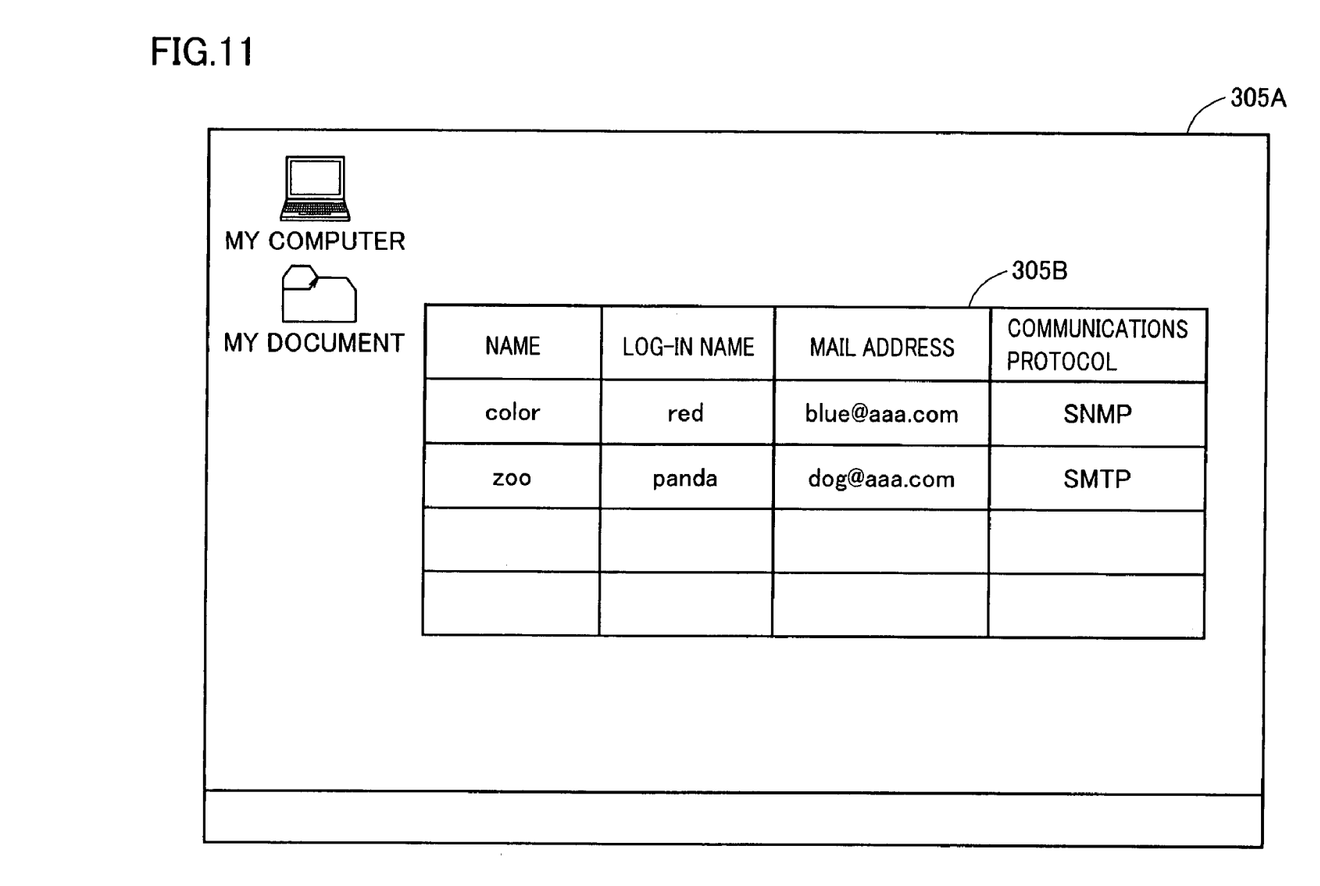
FIG. 11 shows one example of a screen in the image processing system of the fifth embodiment of the present invention that is displayed on a monitor of an image processor when the image processor has information updated.

For example if the user information is modified in information processor 3-Y, monitor 305 displays a screen 305A, as shown in FIG. 11. On screen 305A is displayed user information 305B in the form of a table. A user operates information processor 3-Y by operating keyboard 306 and/or mouse 307, as appropriate, to modify the content(s) of user information 305B displayed and accordingly update the content(s) stored in RAM 302.

Figure 12:
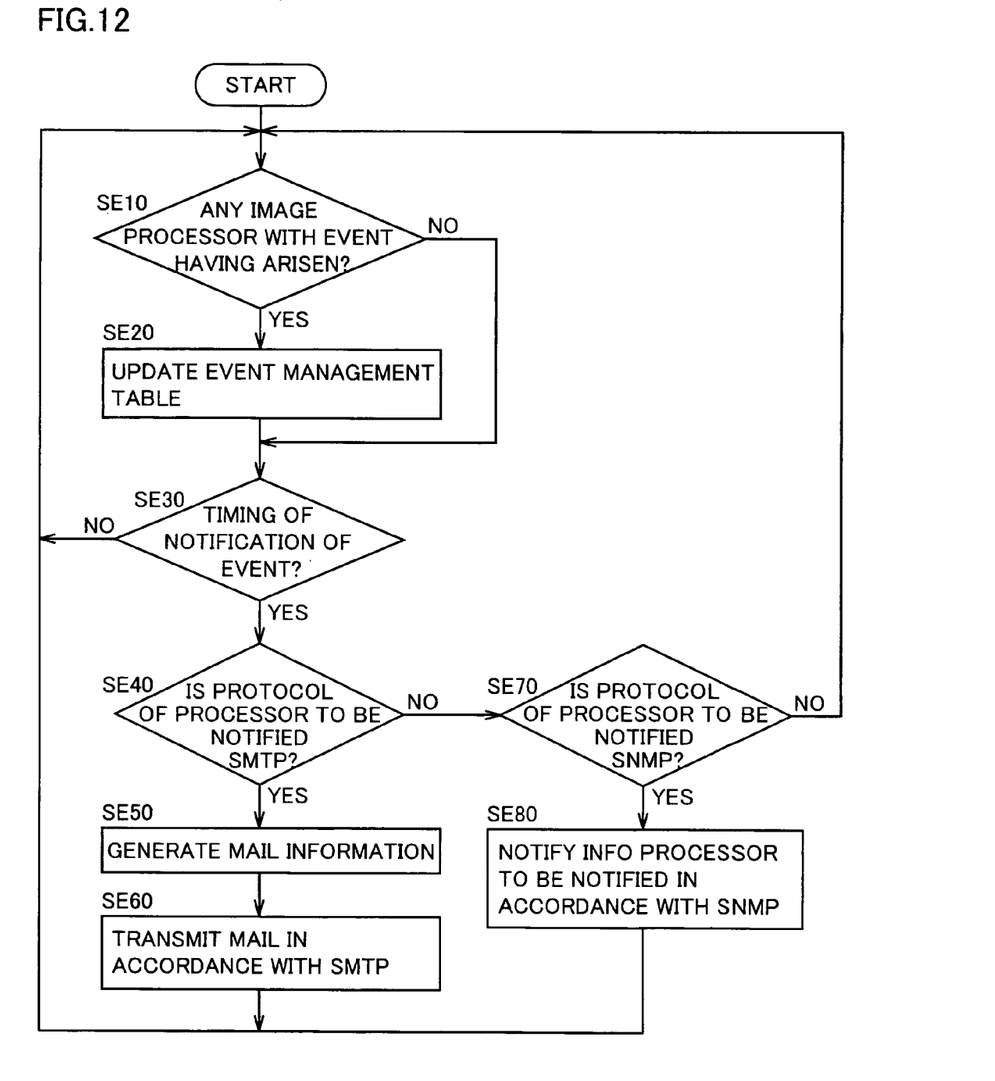
FIG. 12 is a flow chart of a process executed in the image processing system of the fifth embodiment of the present invention by the CPU of the server to notify a user of notification received from an image processor indicating that an event has arisen.

Reference will be made to FIG. 12 to specifically describe a process performed by CPU 201 to notify a user of notification received from an image processor indicating that an event has arisen.

With reference to FIG. 12 CPU 201 at step SE10 determines whether notification that an event has arisen has been received from any of image processors 1-1 to 1-N. If so CPU 201 proceeds to step SE20 to update the event management table in content and proceeds to step SE30, otherwise proceeds directly to step SE30. Note that at step SE20 the event management table is updated by storing as items of such a table as shown in Table 3 a date and time at which an event arises, information that specifies a processor in which the event has arisen (i.e., any of image processors 1-1 to 1-N), the content(s) of the event, and information that specifies a user corresponding to the event, that are included in notification received from the image processor indicating that the event has arisen. Note that in that case, an additionally stored event is assigned a management number.

At step SE30 CPU 201 determines whether a timing has arrived to notify that an event has arisen. The notification is timed in this case to be issued for example when a predetermined period of time elapses after the previous notification was issued. When CPU 201 determines that such timing has arrived, CPU 201 proceeds to step SE40, otherwise returns to step SE10.

At step SE40 CPU 201 determines whether a processor to be notified adopts the SMTP as its protocol. Note that a protocol of a processor to be notified is a notification protocol that a user of the processor to be notified desires to use to be notified that each event has arisen. CPU 201 specifies the user of the processor to be notified from a log-in name of each event stored in the event management table (see Table 3) and refers to the user information (see Table 2) to extract a notification protocol corresponding to the user specified as described above. Then CPU 201 at step SE40 determines whether the extracted protocol is the SMTP. If so CPU 201 proceeds to step SE50, otherwise proceeds to step SE70.

At step SE50 CPU 201 generates mail for notifying the user of the processor to be notified that an event has arisen, and proceeds to step SE60 to transmit the mail and returns to step SE10.

At step SE70, in contrast, CPU 201 determines whether a processor to be notified adopts the SNMP as its protocol. If so CPU 201 proceeds to step SE80 to notify in accordance with the SNMP an image processor that the user of the processor to be notified currently logs in that an event has arisen, and CPU 201 returns to step SE 10. If CPU 201 determines that the processor to be notified does not adopt the SNMP as its protocol, CPU 201 does not perform step SE80 and returns to step SE10.

In the present embodiment a protocol is set, as desired, for each user who is notified that an event has arisen and the protocol thus set is utilized to notify the user accordingly. Furthermore, as the information on that an event has arisen can be collectively managed in server 2, system maintenance can be facilitated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing system having at least one image processor and at least one information processor interconnected,
    said image processor including
    a reception portion receiving an instruction to execute a job from said information processor;
    a detection portion detecting that said job is completed;
    a notification portion operative in response to said detection portion detecting that said job is completed to transmit notification information notifying, in accordance with one of a first communications protocol and a second communications protocol different from said first communications protocol, said information processor that said job is completed; and
    a first reply portion,
    said information processor including
    a first conversion portion converting in a predetermined format said notification information transmitted from said notification portion in accordance with said first communications protocol;
    a second conversion portion converting in a format identical to said predetermined format said notification information transmitted from said notification portion in accordance with said second communications protocol;
    an information display portion collectively displaying, whenever a predetermined period of time elapses, said notification information converted by said first conversion portion and said notification information converted by said second conversion portion;
    a calculation portion calculating a period of time remaining before said predetermined period of time elapses when said detection portion detects said job is completed; and
    a first inquiry portion transmitting information to said image processor to inquire whether any job that said information processor has issued the instruction to execute is to be completed before said remaining period of time has elapsed, wherein
    said first reply portion of said image processor returns, in response to an inquiry received from said first inquiry portion, information of whether any job that said information processor has issued the instruction to execute is to be completed, and
    if said first reply portion returns information indicating that no job that said information processor has issued the instruction to execute is to be completed, said information display portion displays said notification information even before said predetermined period of time elapses.

2. The image processing system according to claim 1, wherein if a predetermined number of items of notification information notifying that jobs are completed is accumulated before said predetermined period of time elapses, said information display portion displays said notification information even before said predetermined period of time elapses.

3. The image processing system according to claim 1, wherein:
    said information processor further includes a determination portion determining whether there exists a user operating said information processor, wherein said information display portion displays said notification information, if said determination portion determines that there exists said user when said information display portion is to display said notification information.

4. The image processing system according to claim 1, wherein:
    said information processor further includes a second inquiry portion inquiring whether an error is caused in said image processor;
    said image processor further includes a second reply portion returning a reply in response to an inquiry received from said second inquiry portion, indicating whether there is an error or not in said image processor; and
    when said second inquiry portion receives a reply indicating that an error is caused, said information display portion displays information indicating that said error is caused, together with said notification information.

5. An information processor connected to at least one image processor, comprising:
    a first reception portion receiving first notification information transmitted from said image processor in accordance with a first communications protocol and notifying that a job that said information processor has issued an instruction to execute is completed;

a second reception portion receiving second notification information transmitted from said image processor in accordance with a second communications protocol different from said first communications protocol and notifying that a job that said information processor has issued an instruction to execute is completed;

a first conversion portion converting in a predetermined format said first notification information into first converted information;

a second conversion portion converting in a format identical to said predetermined format said second notification information into second converted information;

an information display portion collectively displaying said first converted information and said second converted information whenever a predetermined period of time elapses;

a calculation portion calculating a period of time remaining before said predetermined period of time elapses when said first reception portion or said second reception portion receives said first notification information or said second notification information; and a first inquiry portion transmitting information to said image processor to inquire whether any job that said information processor has issued the instruction to execute is to be completed before said remaining period of time has elapsed, wherein if said image processor returns information indicating that no job that said information processor has issued the instruction to execute is to be completed, said information display portion displays said first converted information and said second converted information even before said predetermined period of time elapses.

6. The information processor according to claim 5, wherein if a predetermined number of items of information notifying that jobs are completed is accumulated before said predetermined period of time elapses, said information display portion displays said first converted information and said second converted information even before said predetermined period of time elapses.

7. The information processor according to claim 5, further comprising a determination portion determining whether there exists a user operating said information processor, wherein said information display portion displays said first converted information and second converted information, if said determination portion determines that there exists said user when said information display portion is to display said first converted information and said second converted information.

8. The information processor according to claim 5, further comprising a second inquiry portion inquiring whether an error is caused in said image processor, wherein if said image processor returns information indicating that an error is caused, said information display portion displays said information indicating that said error is caused, together with said first converted information and said second converted information.

9. A method of processing information by use of an information processor, notifying that a job which an image processor is instructed to perform is completed in said imagine processor, comprising:

a first reception step of receiving first notification information transmitted from said image processor in accordance with a first communications protocol and notifying that a job that said information processor has issued an instruction to execute is completed;

a second reception step of receiving second notification information transmitted from said image processor in accordance with a second communications protocol different from said first communications protocol and notifying that a job that said information processor has issued an instruction to execute is completed;

a first conversion step of converting in a predetermined format said first notification information into first converted information;

a second conversion step of converting in a format identical to said predetermined format said second notification information into second converted information;

a step of collectively displaying said first converted information and said second converted information whenever a predetermined period of time elapses;

a calculating step of calculating a period of time remaining before said predetermined period of time elapses when said first notification information or said second notification information is received in said first reception step or said second reception step; and a first inquiry step of transmitting information to said image processor to inquire whether any job that said information processor has issued the instruction to execute is to be completed before said remaining period of time has elapsed, wherein if said image processor returns information indicating that no job that said information processor has issued the instruction to execute is to be completed, said first converted information and said second converted information are displayed in the step of collectively displaying even before said predetermined period of time elapses.

10. The method according to claim 9, wherein if a predetermined number of items of information notifying that jobs are completed is accumulated before said predetermined period of time elapses, said first converted information and said second converted information are displayed in the step of collectively displaying even before said predetermined period of time elapses.

11. The method according to claim 9, further comprising a step of determining whether there exists a user operating said information processor, wherein said first converted information and said second converted information are displayed in the step of collectively displaying if in the step of determining a decision is made that there exists said user when said first converted information and said second converted information are to be displayed in the step of collectively displaying.

12. The method according to claim 9, further comprising a second inquiry step of inquiring whether an error is caused in said image processor, wherein if said image processor returns information indicating that an error is caused, said information indicating that said error is caused is displayed in the step of collectively displaying, together with said first converted information and said second converted information.

* * * * *